United States Patent [19]

Tanaka et al.

[11] Patent Number: 5,774,069
[45] Date of Patent: Jun. 30, 1998

[54] AUTO-DRIVE CONTROL UNIT FOR VEHICLES

[75] Inventors: Hiroaki Tanaka, Toyota; Kazunori Kagawa, Odawara, both of Japan

[73] Assignee: Toyota Jidosha Kabushiki Kaisha, Toyota, Japan

[21] Appl. No.: 743,184

[22] Filed: Nov. 5, 1996

[30] Foreign Application Priority Data

Dec. 5, 1995 [JP] Japan ..................................... 7-316163

[51] Int. Cl.⁶ ............... G08G 1/16; G06F 7/70
[52] U.S. Cl. ............ 340/903; 340/905; 340/436; 364/461; 364/424.028; 180/167
[58] Field of Search ............... 340/903, 905, 340/991, 992, 993, 436; 364/461, 424.028, 436, 460, 424.081, 424.027; 180/167, 168

[56] References Cited

U.S. PATENT DOCUMENTS

| 4,361,202 | 11/1982 | Minovitch | 180/168 |
| 4,530,056 | 7/1985 | MacKinnon et al. | 364/449 |
| 5,369,591 | 11/1994 | Broxmeyer | 340/903 |
| 5,373,911 | 12/1994 | Yasui | 364/424.027 |

FOREIGN PATENT DOCUMENTS

| 3-282713 | 12/1991 | Japan . |
| 3-286315 | 12/1991 | Japan . |
| 6-336167 | 12/1994 | Japan . |

*Primary Examiner*—Jeffrey Hofsass
*Assistant Examiner*—Vam T. Trieu
*Attorney, Agent, or Firm*—Finnegan, Henderson, Farabow, Garrett & Dunner, L.L.P.

[57] ABSTRACT

An auto-drive control unit which can switch a vehicle provided with an auto-drive mode from the auto-drive mode to a manual drive mode at a desired point. Based on detection signals from various types of sensors, an auto-drive controller controls an actuator to perform auto-drive. A changeover switch is provided to switch between the auto-drive and manual drive. The current position of the vehicle is detected by a GPS, and the controller calculates the time to reach the desired point. According to a shifting time to complete the shift to the manual drive, timing for operating the changeover switch is determined, and a message is shown on a warning display to urge a driver to operate the switch. When it is judged that the changeover cannot be completed in time, the controller forcedly decelerate the vehicle.

7 Claims, 4 Drawing Sheets

AUTO-DRIVE CONTROL UNIT FOR VEHICLES

BACKGROUND OF THE INVENTION

1. Field of the Invention

The invention relates to an auto-drive control unit for vehicles, and more particularly to a mode changeover from auto-drive to manual drive.

2. Description of the Related Art

A conventional system for automatically driving by controlling a vehicle speed and steering angle based on information from various types of sensors is known to switch between an auto-drive mode and a manual drive mode when necessary using a changeover switch. For example, Japanese Patent Laid-Open Publication No. Hei 3-286315 discloses an auto-steering device which is provided with a steering mode changeover switch for switching between auto-steering of a vehicle and ordinary manual steering by operating a steering wheel, as desired.

However, since a certain time is required to carry out the shift from the auto-drive mode to the manual drive mode, the changeover to the manual drive may not be made at a desired point depending on the timing at which the changeover switch is operated. For example, assume that a vehicle is running on an expressway in the auto-drive mode and entering an interchange in the manual drive mode. Even when the changeover switch is operated at a location near an interchange where the auto-drive mode is scheduled to be switched to the manual drive mode, the shift to the manual drive may not be completed before reaching the interchange.

SUMMARY OF THE INVENTION

An object of the invention is to provide a device which can complete the shift from auto-drive to manual drive before reaching a scheduled location when a vehicle is running in auto-drive mode toward a location where the vehicle will run in manual drive mode.

To achieve the above object, the auto-drive control unit of the invention comprises running control means for performing auto-drive to control a speed and steering angle of the vehicle based on detection signals from a plurality of sensors, changeover means for switching between the auto-drive and the manual drive, arithmetic means for determining operation timing, on the basis of the transition time involved in the shift from the auto-drive to the manual drive, required to complete the shift from the auto-drive to the manual drive before reaching a scheduled location where the vehicle will run in the manual drive, and information means for urging a driver, on the basis of the operation timing, to operate the changeover means. Since the invention urges the driver to make the changeover operation in view of the transition time required to complete the shift from the auto-drive to the manual drive, it can prevent a situation when the shift to the manual drive cannot be made because the changeover operation was delayed.

As an operation timing determination method, for example, vehicle speed detecting means for detecting a vehicle speed and position detecting means for detecting the current position of a vehicle are provided to calculate the time to reach a scheduled location on the basis of the vehicle speed and a distance between the current position and the scheduled location where the vehicle is to be driven in the manual drive and to determine the operation timing on the basis of the transition time and the scheduled location arriving time.

If the driver does not operate the changeover means at the determined operation timing, the vehicle is forcedly braked by auto-brake means or taken out of a cruising lane and stopped in some cases, thereby securely shifting to the manual drive.

The scheduled location where the vehicle is to run in the manual drive is assumed to be a safety zone of the auto-drive lane, such as an interchange.

DETAILED DESCRIPTION OF THE PREFERRED EMBODIMENT

An embodiment of the invention will be described with reference to the accompanying drawings.

Figure 1:
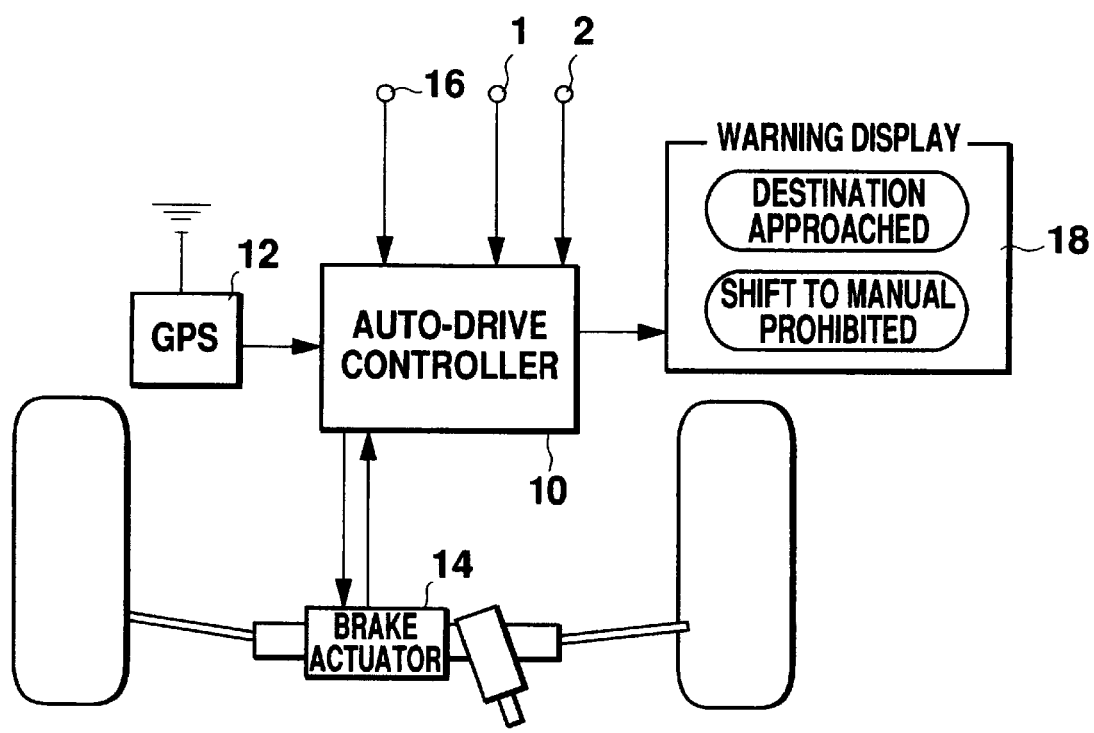
FIG. 1 is a structural block diagram of an embodiment according to the invention.

FIG. 1 is a structural block diagram of this embodiment. Upon receiving information from various sensors such as an obstruction sensor 1 and a vehicle speed sensor 2, an auto-drive controller 10 drives an auto-drive actuator 14 to effect auto-driving while controlling a vehicle speed and steering. A changeover switch 16 for alternately switching between the auto-drive and the manual drive is provided near the driver's seat, and its changeover signal is supplied to the auto-drive controller 10. The auto-drive controller 10 also receives a detection signal from a GPS device 12 for detecting the position of an applicable car. The auto-drive controller 10 determines the timing for operating the changeover switch 16 according to a predetermined shift time stored in a memory, namely a time required to complete the changeover from the auto-drive to the manual drive, and judges whether or not the applicable car has reached a position where the auto-drive should be switched to the manual drive. A judged result is shown on a warning display 18 provided near the driver's seat. Specifically, "DESTINATION APPROACHED" is displayed as shown in FIG. 1. Also, when it is judged that the shift cannot be completed because the applicable car is positioned where the shift to the manual drive cannot be made in time, it is also shown on the warning display 18. Specifically, "SHIFT TO MANUAL DRIVE PROHIBITED" is displayed. In such a case, the auto-drive controller 10 activates the actuator 14 to brake the vehicle and forces deceleration of the vehicle before a scheduled changeover location, guides the vehicle to leave the cruising lane into a roadside zone, and stops there. Though not shown, it is preferable to combine the above system with a conventional navigation system.

The embodiment is configured as described above, and the process by the auto-drive controller will be described below in detail.

Figure 2:
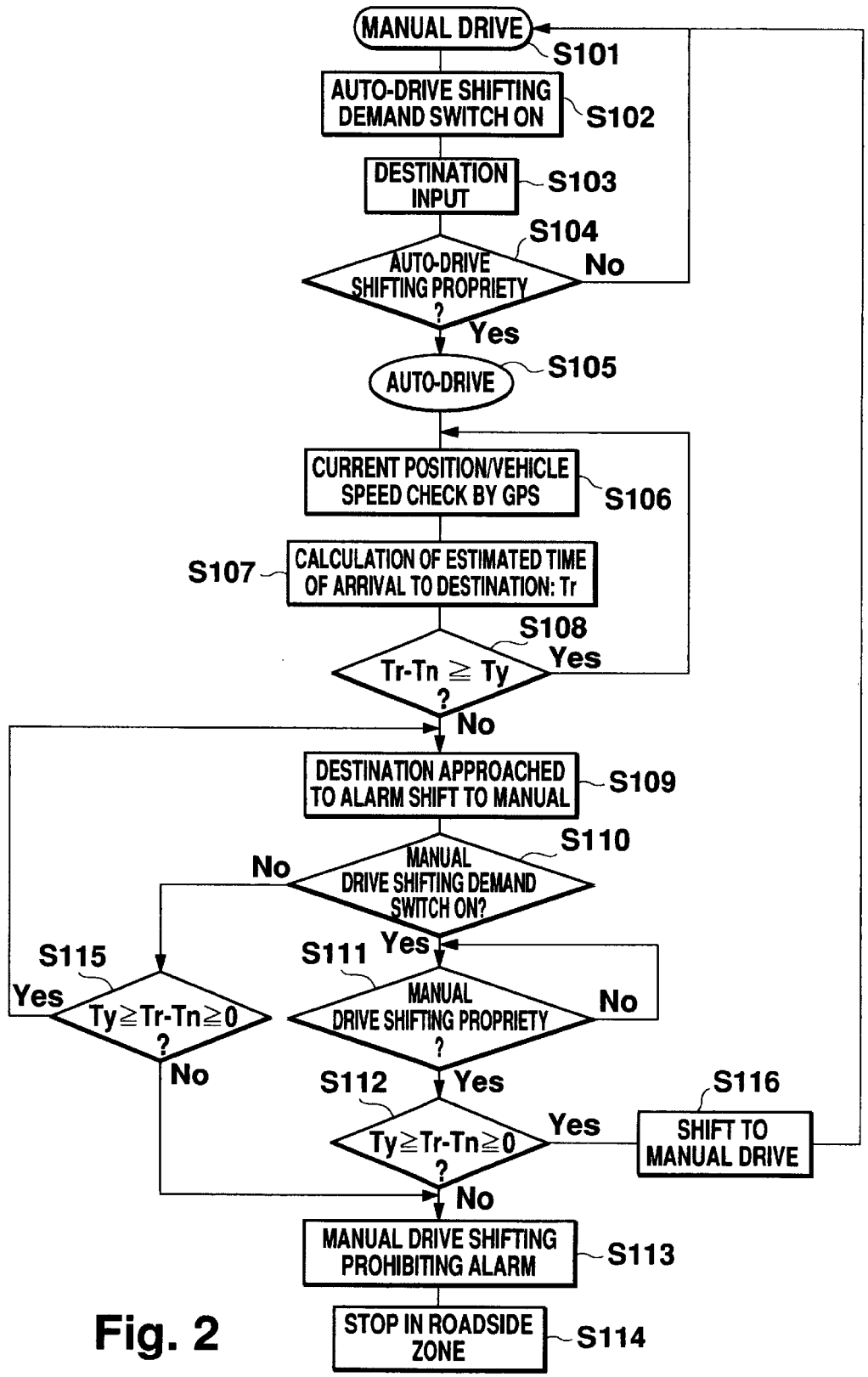
FIG. 2 is a processing flowchart of the device shown in FIG. 1.

FIG. 2 shows a processing flowchart of the auto-drive controller 10. A running situation is assumed to be a vehicle is running in the manual drive on road that can be driven along automatically (e.g., an expressway). In this manual drive (S101), it is assumed that a driver desires to shift to the auto-drive by operating the changeover switch 16 (S102). To switch to the auto-drive, a location where the auto-drive is performed is input (S103). In this embodiment, it is assumed that the vehicle runs in the auto-drive to a given interchange IC. In this case, the controller 10 judges whether or not the drive can be shifted to the auto-drive (S104), and if it can, controls to shift to the auto-drive (S105). Situations where the shift to the auto-drive cannot be made include, for example, case where the vehicle is not running in the auto-drive lane, remaining fuel is insufficient to reach a destination, or the auto-drive system has a defect.

When the vehicle is running in the auto-drive mode, the current position of the vehicle is continuously detected on the basis of the signal from the GPS, and the vehicle speed is checked according to the signal from the vehicle speed sensor 2 (S106). After checking the location and the vehicle speed, an expected time of arrival Tr at the destination, namely the IC where the drive should be changed to the manual drive, is calculated according to such data (S107). Specifically, a distance between the current position and the destination is divided by an average vehicle speed, and data on the distance between the current position and the destination can be attained in view of map data stored in an on-board navigation system. After calculating the expected time of arrival, the controller 10 judges whether or not it is time to operate the changeover switch 16 in view of a shift time, namely transition time Tn required to complete the shift to the manual drive, previously stored in the memory (S108). This judgment is made according to whether or not a difference between the expected time of arrival Tr and the transition time Tn is equal to or exceeds an allowance time Ty. When (Tr−Tn) is equal to or exceeds the allowance time Ty, it is judged that the changeover switch shall not be operated yet because there is a sufficient allowance, and S106 and following processes are repeated. On the other hand, when (Tr−Tn) is less than the allowance time Ty, the controller 10 judges that it is time to operate the changeover switch 16 and shows a message "DESTINATION APPROACHED" on the warning display 18 to urge the driver to operate the changeover switch 16 (S109). It is preferable to show the message together with voice guidance, and the driver's seat or the steering wheel may be vibrated at the same time as the message is displayed. During the auto-drive, the driver does not perform any particular operation, so that an alertness level of the driver may be lowered considerably, and this message is significant to attract the driver's attention. After displaying the message, it is judged whether or not the changeover switch 16 has been operated (S110). When the driver has operated the changeover switch 16 in response to the message, the controller 10 judges whether or not the drive can be shifted to the manual drive (S111). Situations where the shift to the manual drive cannot be made include, for example, cases where another vehicle has cut in between a preceding vehicle and the applicable car to suddenly shorten a vehicle-to-vehicle distance and the system is performing auto-braking. When the current running situation is judged to be a situation where the drive can be shifted to the manual drive, it is judged whether or not the changeover to the manual drive can be completed before reaching the destination (S112). This judgment refers to the prescribed transition time Tn and is made according to whether or not Ty≧Tr−Tn≧0 holds. For example, Tr−Tn<0 means that the shift to the manual drive cannot be completed before reaching the destination because the timing to operate the changeover switch 16 was delayed, so that the shift to the manual drive is prohibited and an appropriate message is shown on the warning display 18 (S113). Then, the actuator 14 is activated to forcedly brake the vehicle to stop in a roadside zone (S114). In this case, after stopping in the roadside zone, the driver operates the changeover switch 16 again to switch to the manual drive. Further, Tr−Tn>0 means that the shift to the manual drive can be completed before reaching the destination, so that the shift to the manual drive is allowed (S116).

If the driver does not operate the changeover switch 16 even though the driver is urged to operate the changeover switch 16 in S109, it is also judged whether or not Ty≧Tr−Tn≧0 holds (S115). If there is time left which is required to shift to the manual drive, the driver is continuously urged to operate the changeover switch 16 because the above condition holds, and when (Tr−Tn)<0 holds, the shift to the manual drive is prohibited and the vehicle is forcedly decelerated because the changeover to the manual drive can no longer be made (S113, S114).

Figure 3:
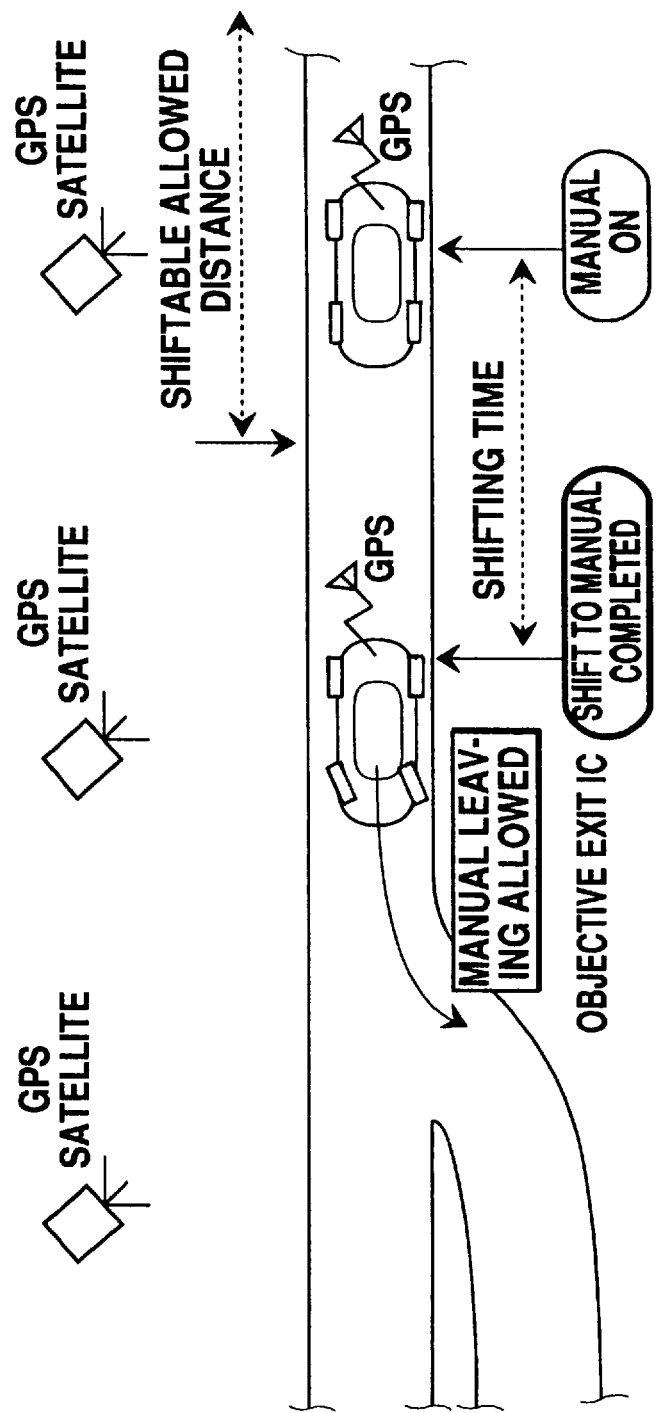
FIG. 3 is a running explanatory view of a situation where a changeover switch is operated appropriately.
Figure 4:
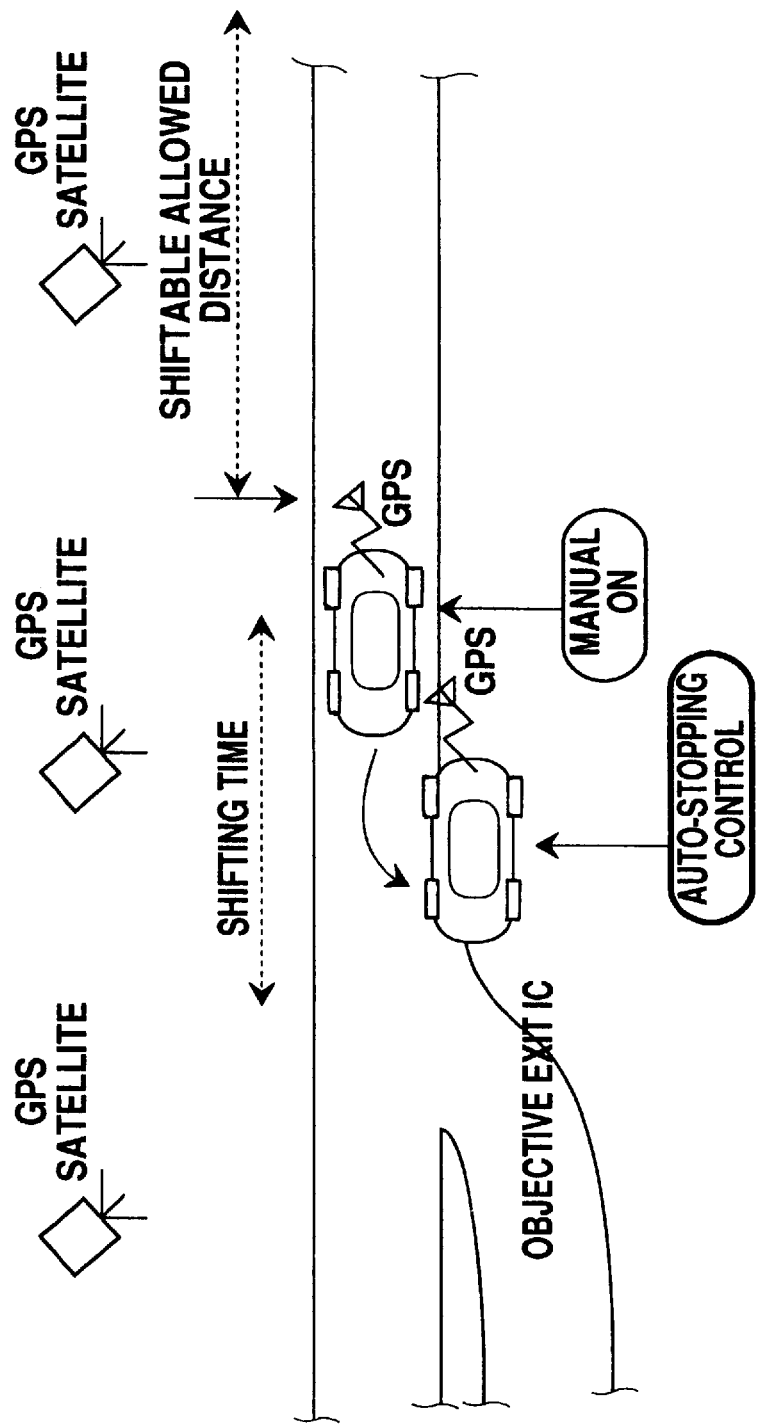
FIG. 4 is a running explanatory view of a situation where the changeover switch is not operated appropriately.

FIG. 3 and FIG. 4 show situations where the changeover switch 16 was operated by the driver at an appropriate timing (Ty≧Tr−Tn≧0) and where timing operating the changeover switch was delayed (Tr−Tn<0), respectively. FIG. 3 shows that the changeover switch 16 was operated by the driver while the vehicle was running an allowed distance in which the shift could be made, the changeover from the auto-drive mode to the manual drive mode could be completed by the system after a prescribed shifting time, and the vehicle could enter an objective exit IC in the manual drive. On the other hand, FIG. 4 shows that the changeover switch 16 was operated after the vehicle had left a limited distance in which the shift could be made, the shift from the auto-drive mode to the manual drive mode could not be completed before the vehicle had reached a destination, the controller 10 which had determined such a situation by calculating forcedly decelerated the vehicle to guide to a safety zone before an exit IC, and the vehicle was stopped in a roadside zone.

Thus, in this embodiment, it is judged in view of a prescribed shifting time whether or not the shift from the auto-drive mode to the manual drive mode can be completed before the vehicle has reached a destination and an appropriate measure is taken according to the judged result, so that the changeover to the manual drive can be made reliably at a desired point.

The embodiment has been described with respect to case that when it is judged that the operation of the changeover switch is delayed, the vehicle is forcedly decelerated to be stopped at a shoulder of a road. However, the vehicle may be fully decelerated without stopping until (Tr−Tn)>0 holds.

Also, this embodiment has used the GPS to detect the current position of the vehicle, but the vehicle position may be detected according to data from road beacons laid on the auto-drive lane or vehicle-to-vehicle communications.

This embodiment has exemplified the exit of the cruising lane before an interchange of the expressway as the scheduled location where the auto-drive mode shall be switched to the manual drive mode. However, the embodiment is not limited to the lane exit, and may be applied to a given turnoff from a lane where the vehicle can run in the auto-drive mode. For example, the entrance to a service area can be determined as the scheduled location. Further, when the scheduled location is not determined to be an exit from the cruising lane but a location a prescribed distance before the exit, the driver can drive the vehicle in the manual drive mode for the prescribed distance after shifting from the auto-drive to the manual drive, so that the driver can recover the manual drive feeling.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. An auto-drive control unit for a vehicle having auto-drive and manual drive modes of operation, comprising:

running control means for performing auto-drive control running of the vehicle based on detection signals from a plurality of sensors, changeover means for switching between the auto-drive and manual drive, memory means for storing a transition time inherent to the vehicle involved in the shift from the auto-drive to the manual drive, arithmetic means for determining operation timing of said changeover means, on the basis of the transition time, required to complete the shift from the auto-drive to the manual drive before the vehicle has reached a scheduled location where the vehicle is to be run in the manual drive, and information means for urging on the basis of said operation timing a driver to operate said changeover means.

2. The auto-drive control unit according to claim 1, further comprising:

vehicle speed detecting means for detecting a vehicle speed and position detecting means for detecting the current position of the vehicle, wherein said arithmetic means calculate a scheduled location arrival time of the vehicle on the basis of the vehicle speed and a distance between the current position and the scheduled location where the vehicle shall be driven in the manual drive and determine said operation timing on the basis of a difference between said transition time and said scheduled location arrival time.

3. The auto-drive control unit according to claim 1, further comprising:

auto-brake means for decelerating the vehicle when the driver does not operate said changeover means at said operation timing.

4. The auto-drive control unit according to claim 3, further comprising:

auto-steering means for moving the vehicle from an auto-drive lane.

5. The auto-drive control unit according to claim 1, wherein the scheduled location where the vehicle is to run in the manual drive is a safety zone of the auto-drive lane.

6. An auto-drive control unit for a vehicle having auto-drive and manual drive modes, comprising:

a controller for performing auto-drive, a mode changeover switch for alternately switching between an auto-drive mode and a manual drive mode, a memory for storing a transition time inherent to the vehicle involved in the shift from the auto-drive mode to the manual drive mode, and information means for giving, at a time based on the transition time, a message advising operating said changeover switch to shift to the manual drive mode to a driver while the vehicle is running in the auto-drive mode.

7. The auto-drive control unit according to claim 6, further comprising:

an auto-braking device for decelerating the vehicle when said changeover switch is not operated in accordance with said message.

* * * * *